United States Patent [19]
Robb

[11] Patent Number: 5,329,404
[45] Date of Patent: * Jul. 12, 1994

[54] LASER BEAM EXPANDER: 5X
[75] Inventor: Paul N. Robb, Santa Clara, Calif.
[73] Assignee: Lockheed Missiles & Space Company, Inc., Sunnyvale, Calif.
[*] Notice: The portion of the term of this patent subsequent to Apr. 19, 2011 has been disclaimed.
[21] Appl. No.: 979,015
[22] Filed: Nov. 20, 1992
[51] Int. Cl.$^5$ .............................................. G02B 9/34
[52] U.S. Cl. .................................... 359/771; 359/355; 372/101
[58] Field of Search ................. 372/98, 101, 108, 109; 359/355, 721, 741, 771-783

[56] References Cited
U.S. PATENT DOCUMENTS

| 4,139,267 | 2/1979 | Minoura | 359/779 |
| 4,377,326 | 3/1983 | Kobayashi | 359/776 |
| 4,770,477 | 9/1988 | Shafer | 359/355 |
| 4,936,665 | 6/1990 | Whitney | 359/721 X |

Primary Examiner—John D. Lee
Attorney, Agent, or Firm—John J. Morrissey

[57] ABSTRACT

A 5× laser beam expander lens that is well-corrected for chromatic aberration can be used without refocussing over a wavelength range from 0.365 micron to 1.3 micron.

3 Claims, 2 Drawing Sheets

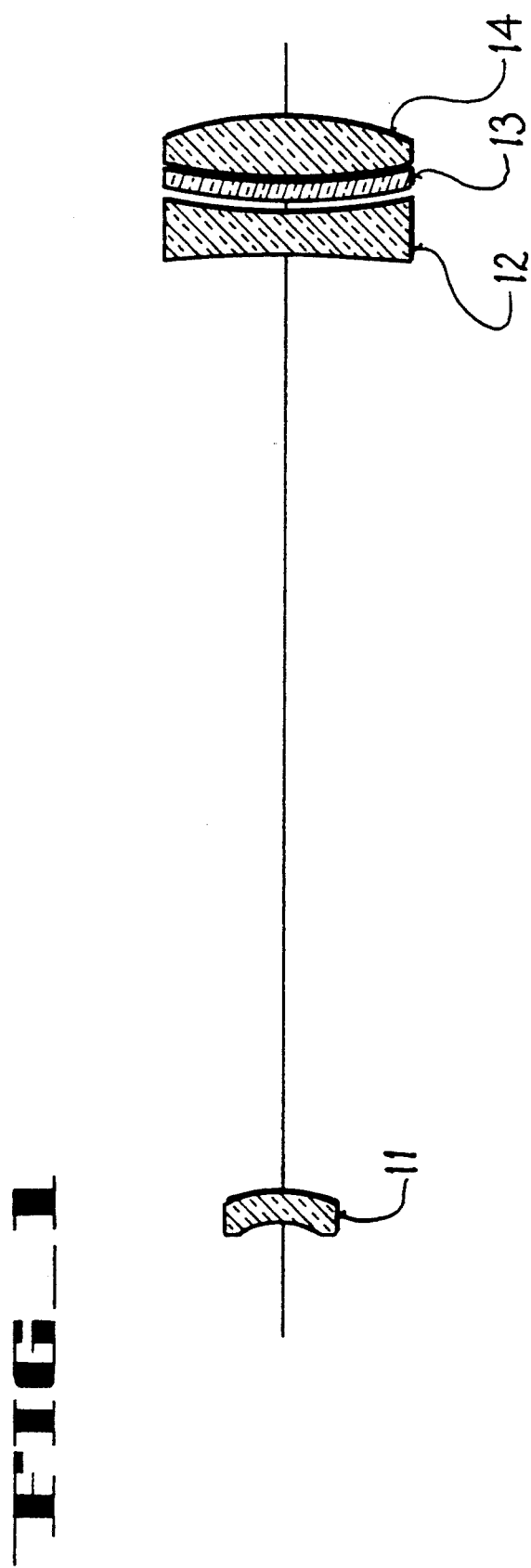
FIG_1

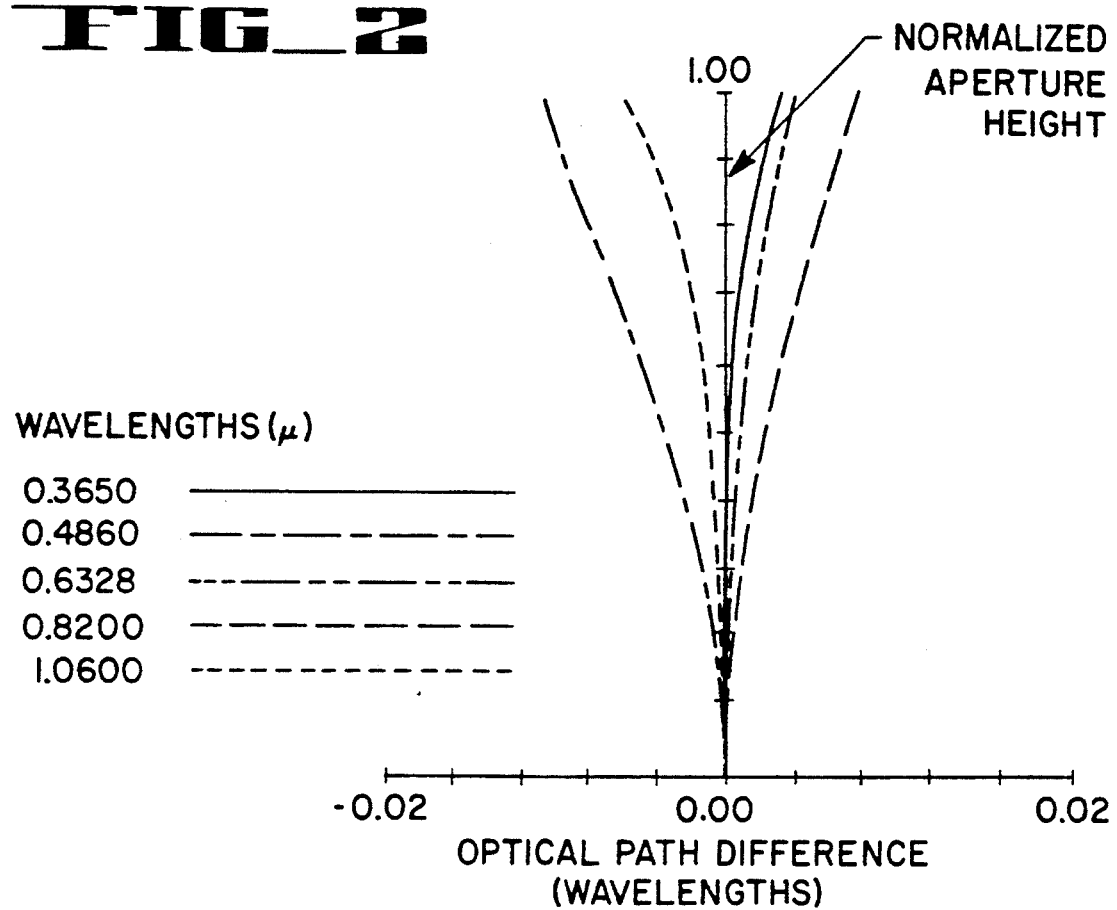
FIG_2
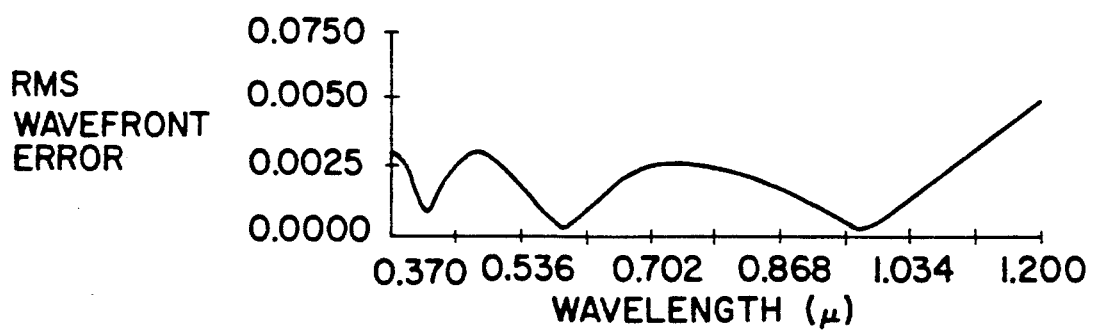
FIG_3

LASER BEAM EXPANDER: 5X

TECHNICAL FIELD

This invention relates generally to laser beam expanders, and more particularly to a 5× laser beam expander that can be used without refocussing for laser beams within a wavelength range from 0.365 micron to 1.3 micron.

BACKGROUND ART

For laser beam expanders of the prior art, a different lens was generally required for each wavelength. A need has been recognized for a single beam-expander lens that can be used over a wide wavelength band from 0.365 micron to 1.3 micron, whereby the expense and inconvenience of using different lenses for different wavelengths can be avoided.

SUMMARY OF THE INVENTION

It is an object of the present invention to provide a 5× laser beam expander (i.e., a lens that can expand a laser beam by five times—e.g., from a diameter of 2 mm to a diameter of 10 mm), which is well-corrected for chromatic aberration, and which can be used without refocussing over a wavelength range from 0.365 micron to 1.3 micron.

In accordance with the present invention, a design form is disclosed for a superachromatic 5× laser beam expander, which exhibits substantially diffraction-limited performance with a root-mean-square (rms) wavefront error of less than 1/120th of a wave over the wavelength range from 0.365 micron to 1.3 micron.

DESCRIPTION OF THE DRAWING

FIG. 1 is a profile drawing of a laser beam expander according to the present invention.

FIG. 2 is a plot of normalized aperture height vs. optical path difference at five different wavelengths for the laser beam expander of FIG. 1.

FIG. 3 is a plot of rms wavefront error vs. wavelength over the wavelength range from 0.365 micron to 1.3 micron for the laser beam expander of FIG. 1.

BEST MODE OF CARRYING OUT THE INVENTION

As illustrated in FIG. 1, a laser beam expander lens according to the present invention comprises four lens elements 11, 12, 13, and 14 made of three different types of optical glasses, which are configured and coaxially positioned with respect to each other according to an optical prescription specified in tabular format as follows:

TABLE I

| Surface No. | Radius (mm) | Thickness (mm) | $N_d$ | $V_d$ | Material |
|---|---|---|---|---|---|
| 1 | −5.8219 | 2.0000 | 1.788310 | 47.394 | LAF21 |
| 2 | −10.1785 | 67.7952 | | | Air |
| 3 | −180.8825 | 3.0000 | 1.788310 | 47.394 | LAF21 |
| 4 | 47.5947 | 0.5200 | | | Air |
| 5 | 40.6509 | 2.0000 | 1.698951 | 30.067 | SF15 |
| 6 | 50.2010 | 0.2540 | | | Air |
| 7 | 99.8816 | 3.9700 | 1.528554 | 76.960 | PK51 |
| 8 | −25.5475 | 10.0000 | | | Air | where the surfaces of the lens elements are numbered consecutively from left to right along an optic axis in accordance with optical design convention. Thus, surfaces No. 1 and No. 2 are the left and right surfaces, respectively, of the lens element 11; and surfaces No. 3 and No. 4 are the left and right surfaces, respectively, of the lens element 12. Surfaces No. 5 and No. 6 are the left and right surfaces, respectively, of the lens element 13; and surfaces No. 7 and No. 8 are the left and right surfaces, respectively, of the lens element 14.

The radius listed for each lens surface in Table I is the radius of curvature expressed in millimeters. In accordance with convention, the radius of curvature is positive if the center of curvature of the surface lies to the right of the surface, and negative if the center of curvature of the surface lies to the left of the surface. The thickness listed for each lens surface is the thickness expressed in millimeters of the lens element bounded on the left by the surface. The thickness of each lens element is measured along the optic axis.

The column headed $N_d$ in Table I refers to the index of refraction of the lens element bounded on the left by the indicated surface at the wavelength of the sodium d spectral line (i.e., 0.58756 micron). The column headed $V_d$ refers to the Abbe number for the lens element bounded on the left by the indicated surface. The material listed for each surface in Table I refers to the type of material bounded on the left by that surface. Thus, lens elements 11 and 12 are made of Schott LAF21 optical glass; lens element 13 is made of Schott SF15 glass; and lens element 14 is made of Schott PK51 glass. These specified types of optical glasses are marketed by Schott Optical Glass Inc. of Duryea, Penn.

The index of refraction of an optical material varies with wavelength. The indices of refraction for the three different materials comprising the lens elements 11, 12, 13, and 14 of the beam expander of FIG. 1 at five representative wavelengths in the range from 0.365 micron to 1.3 micron (i.e., $N_1$ at 0.36500 micron; $N_2$ at 0.48600 micron; $N_3$ at 0.63280 micron; $N_4$ at 0.82000 micron; and $N_5$ at 1.06000 micron) are tabulated as follows:

TABLE II

| Material | $N_1$ | $N_2$ | $N_3$ | $N_4$ | $N_5$ |
|---|---|---|---|---|---|
| LAF21 | 1.788310 | 1.799938 | 1.783305 | 1.809171 | 1.780483 |
| SF15 | 1.698951 | 1.715459 | 1.692213 | 1.729387 | 1.688533 |
| PK51 | 1.528554 | 1.533331 | 1.526463 | 1.537040 | 1.525274 |

It is instructive to evaluate the performance of the laser beam expander shown in FIG. 1 at each of the above-specified wavelengths. A graphical indication of performance of a lens system at a particular wavelength is provided by a plot of optical path difference as a function of normalized aperture height for that wavelength. In FIG. 2, plots of optical path difference as a function of normalized aperture height are shown for the five wavelengths specified for Table II. It is apparent from FIG. 2 that the maximum wavefront error for any of the five wavelengths plotted is less than λ/95 for the laser beam expander shown in FIG. 1.

The optical path difference (OPD) error of an optical system at a particular wavelength is defined as the difference between the optical path length of a ray traced through a particular location in the entrance pupil of the system at a specified field angle and the optical path length of a reference ray, where the reference ray is usually (but not always) the so-called "chief ray" or "principal ray" traced through the center of the pupil at that specified field angle. The wavefront error of an optical system at a particular field angle is calculated as the statistical root-mean-square (rms) of the optical path differences of a number of rays traced through the system at a single wavelength. A grid of equally spaced rays is generally used, and the statistics are accumulated with respect to the point in the image plane where the rms wavefront error is a minimum for the particular field angle and wavelength.

FIG. 3 is a plot of rms wavefront error versus wavelength for rays entering the laser beam expander of FIG. 1 parallel to the optic axis (i.e., at a field angle of zero) over the wavelength range from 0.365 micron to 1.3 micron. It is apparent from FIG. 3 that the wavefront error of the laser beam expander of FIG. 1 is less than $\lambda/333$ (i.e., less than 0.003 of a wave) out to a wavelength of 1.10 micron, and is only $\lambda/138$ (i.e., less than 0.0072 of a wave) at the limiting wavelength of 1.30 micron. The average rms wavefront error over this wavelength range is $\lambda/413$.

The laser beam expander of the present invention effectively expands an input laser beam from a diameter of 2 mm to a diameter of 10 mm (i.e., a 5× expansion) without requiring refocussing anywhere in the spectral range from 0.365 micron to 1.3 micron. The laser beam expander is diffration limited over that spectral range, so that chromatic aberration is virtually absent in the expanded beam.

The present invention has been described above in terms of a particular embodiment. However, practitioners skilled in the art of optical design could develop different design forms for laser beam expanders intended for particular applications by modifying parametric values of the design form disclosed above. Accordingly, the present invention is defined more generally by the following claims and their equivalents.

I claim:

1. A lens system operative at a common focal position over a wavelength range from 0.365 micron to 1.3 micron for expanding an optical beam by five times in diameter, said lens system comprising a plurality of lens elements, all of said lens elements being made of optical glass, said lens elements remaining at fixed positions with respect to each other for operation of said lens system over said wavelength range, said lens system being substantially diffraction limited over said wavelength range.

2. The lens system of claim 1 consisting of four lens elements made of optical glasses.

3. A laser beam expander comprising four lens elements configured and positioned with respect to each other along an optic axis according to a design form specified as follows:

| Surface No. | Radius (mm) | Thickness (mm) | $N_d$ | $V_d$ | Material |
|---|---|---|---|---|---|
| 1 | −5.8219 | 2.0000 | 1.788310 | 47.394 | LAF21 |
| 2 | −10.1785 | 67.7952 | | | Air |
| 3 | −180.8825 | 3.0000 | 1.788310 | 47.394 | LAF21 |
| 4 | 47.5947 | 0.5200 | | | Air |
| 5 | 40.6509 | 2.0000 | 1.698951 | 30.067 | SF15 |
| 6 | 50.2010 | 0.2540 | | | Air |
| 7 | 99.8816 | 3.9700 | 1.528554 | 76.960 | PK51 |
| 8 | −25.5475 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

* * * * *